Dec. 30, 1969  R. B. WIDTH  3,487,193
ELECTRIC RESISTANCE WELDING ELECTRODE HOLDER
HAVING A RESILIENTLY EXTENDING COOLANT
CIRCULATION TUBE
Filed June 4, 1968
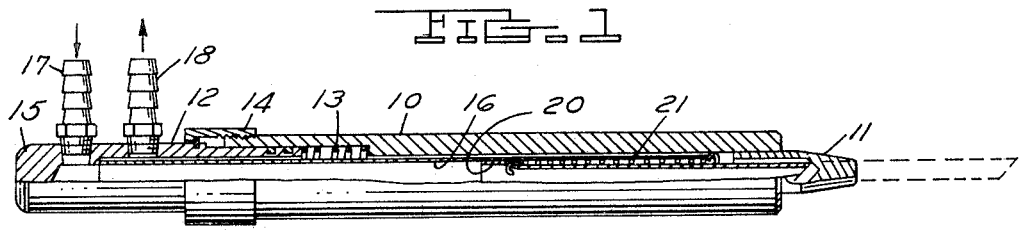
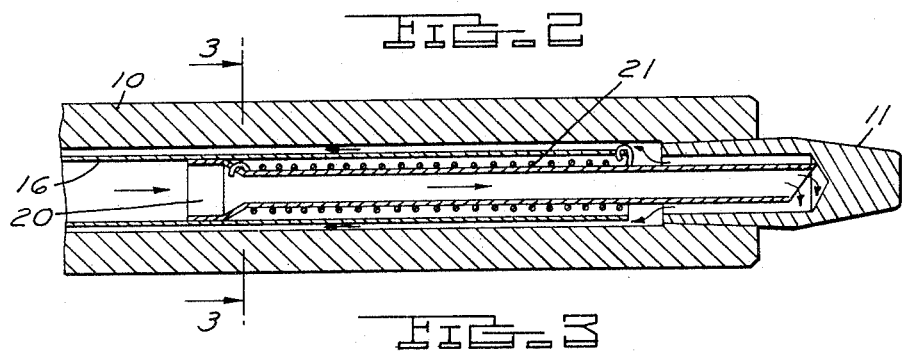
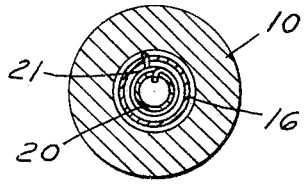
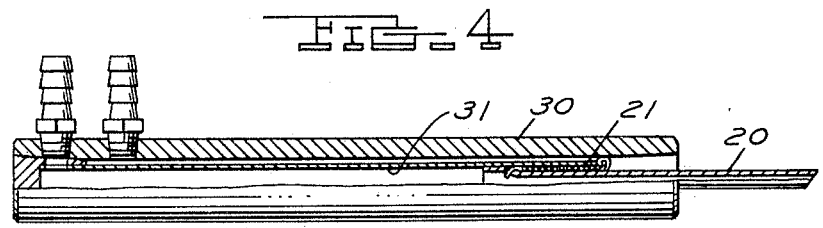
INVENTOR.
ROBERT B. WIDTH
BY
ATTORNEY United States Patent Office 3,487,193
Patented Dec. 30, 1969

3,487,193
ELECTRIC RESISTANCE WELDING ELECTRODE HOLDER HAVING A RESILIENTLY EXTENDING COOLANT CIRCULATION TUBE
Robert B. Width, Rochester, Mich., assignor to Tuffaloy Products, Inc., Detroit, Mich., a corporation of Michigan
Filed June 4, 1968, Ser. No. 734,497
Int. Cl. B23k 9/24, 11/30
U.S. Cl. 219—120                    1 Claim

ABSTRACT OF THE DISCLOSURE

An electric welding electrode holder combination having a coolant circulation extension tube telescopically slideably positioned and resiliently spring biased toward an electrode mounted in the holder body so as to automatically locate the end of the extension tube against the bottom of the cavity of the electrode to circulate the coolant directly at the electrode cavity bottom thereby automatically eliminating manual positioning and locating and preventing displacement of the extension tube in mounting an electrode on the body.

---

This invention relates to electric welding electrode holders and particularly pertains to a combined spring biased coolant circulation extension tube which is resiliently extended to end of the electrode cavity.

In electric welding the metal is melted between the electrodes to effect fusion. The melting heat is produced by the electric current passed through the metal between the opposed electrodes. Thus the electrodes are subjected to very high temperatures. This necessitates cooling the electrodes by circulating coolant fluid internally of the electrodes. Since the electrode is hottest at its very tip it is highly desirable to circulate the coolant to the bottom of the electrode coolant cavity. The coolant tube must thus reach to the bottom of the coolant cavity for maximum efficiency.

With the foregoing in view, it is a primary object of the invention to provide a coolant extension tube which automatically extends to the bottom of the electrode coolant cavity.

Another object of the invention is to provide a spring biased coolant circulation extension tube which is resiliently extended into contact with the bottom of the electrode coolant cavity.

Another object of the invention is to provide a spring biased coolant circulation tube which resiliently automatically adjusts to the depth of the electrode coolant cavity so that cavity depth differences between different electrodes is self compensated.

Another object of the invention is to provide an automatically extending coolant tube to insure maximum efficiency regardless of workman errors and carelessness.

An object of the invention is to provide a spring biased coolant tube which is usable with any type holder including those having electrode knock-out tubes and which resiliently maintains its proper extended position especially after the electrode is mounted.

These and other objects of the invention will become apparent by reference to the following description of a resilient extension tube combined in holders embodying the invention taken in connection with the accompanying drawing, in which:

FIG. 1 is a side elevational view, partly in axial cross-section, of the novel holder and resilient coolant tube of the invention showing the tube extension in dotted lines.

FIG. 2 is an enlarged longitudinal cross-sectional view of the electrode end of the device seen in FIG. 1, showing the interior construction in greater detail.

FIG. 3 is a radial cross-sectional view of the device seen in FIGS. 1 and 2 such as taken on the line 3—3 of FIG. 2; and FIG. 4 is a view similar to FIG. 1 showing a different type holder with the electrode removed and the coolant tube resiliently projected.

Referring now to the drawing wherein like numerals refer to like and corresponding parts throughout the several views, the electrode holder resilient coolant-tube extension combination shown therein to illustrate the invention comprises a hollow cylindrical body 10 and an electrode 11 seated in the body 10. The body 10 has an internal tapered socket and the electrode 11 has an external tapered shank which interfit securely, FIGS. 1–3. A barrel 12 is slideably fitted in the body 10 against a spring 13. A collar 14 secures the barrel 12 on the body 10. The barrel 12 has a head 15. An electrode "knock-out" tube 16 is fixed on the barrel 12 and extends within the body to a point adjacent the interior end of the electrode 11. When it is desired to eject the electrode 11 from the body 10, the user hits the barrel head 15 with a hammer driving the barrel 12 and knock-out tube 16 axially within the body as permitted by the spring 13 and collar 14 toward and into forceful contact with the electrode 11. This ejects the electrode from the body 10.

The barrel 12 and knock-out tube 16 are also used as coolant fluid channeling means. A coolant fitting 17 and a coolant fitting 18 are mounted on the barrel 12 in communication with the interior and exterior respectively of the knock-out tube 16.

An extension tube 20 is telescopically axially slideably mounted relative to the knock-out tube 16. A spring 21 is disposed between the tubes 16 and 20 and has its opposite ends connected to them so that the spring 21 normally resiliently urges the extension tube 20 axially outwardly of the knock-out tube 16 and the body 10, such as seen in FIG. 4, from which position the extension tube is resiliently movable against the spring 21 axially inwardly of the body 10 and knock-out tube 16 to the positions seen in FIGS. 1 and 2 by contact with the electrode 11.

The coolant fluid flow circulates into fitting 17 through the barrel 12 to the interior of the knock-out tube 16 and the interior of the extension tube 20 to its outer end directly to the base of the cavity in the electrode 11. The coolant fluid flow returns exteriorly of the extension tube 12 and exteriorly of the knock-out tube 16 to the fitting 18 in the space between the body 10 and the barrel 12. The coolant flow is illustrated by the arrows of FIG. 2. Thus the coolant fluid is directly impinged against the electrode 11 cavity base in closest proximity possible to its tip so as to provide maximum cooling efficiently to keep the electrode 11 tip as cool as possible.

The resiliently extensible condition of the coolant tube 20 insures that the end of the coolant tube 20 abuts the bottom of the cavity in the electrode 11 automatically so that workman errors and difficult manual adjustments of the extension tube are eliminated.

For example without the automatic resilient projection of the extension tube 20, a workman must calculate the needed extension of an extension tube and then seat the electrode 11 in the body. If he does not project the extension tube 20 out far enough it does not then extend to the bottom of the electrode 11 cavity. If he projects the extension tube 20 too far out, then the hammer blow on the electrode 11 to seat it in the body is transferred to the end of the extension tube and the extension tube is driven up into the body in remote spaced relation to the electrode 11. Thus it is substantially impossible to properly locate the extension tube manually as the point between over projection and under projection can hardly be measured accurately and is subject to too many variables such as over seating and under seating of the electrode in the body. Moreover it is impossible to tell where the end of the extension tube is under manual adjustment conditions after the electrode is set in the body 10.

It will be understood therefore that the resiliently mounted extension tube of the invention is spring pressed against the bottom of the electrode cavity at all times and only resiliently bounces out of and back into contact when the electrode 11 is set in the body 10.

FIG. 4 shows holder body 30 type not having a knockout tube but rather having a fixed inner tube 31. With this type body the electrode is not knocked out but rather is pulled out with a wrench or pliers. However the resilient extension tube 20 and spring 21 accomplish their intended purpose and function regardless of the difference in the manner of removing the electrode.

I claim:
1. An electric welding electrode holder combination having internal coolant fluid circulation means comprising,
   a hollow cylindrical body having an electrode end,
   an inner tube mounted within said body, said inner tube having an internal wall of relatively large internal diameter,
   an extension tube telescopically mounted relative to said inner tube for bi-directional sliding axial movement relative to said inner tube and said body electrode end, said extension tube having an outer wall of relatively small outside diameter; said telescopic inner and extension tubes lying in radially spaced relationship creating a circumferential chamber between said tubes;
   said extension tube having an outer end projectable axially outwardly of said body electrode end by said telescopic sliding movement and movable inwardly toward said body at said electrode end by said telescopic sliding movement and having a radially outwardly flanged interior end in sliding contact with said inner tube internal wall;
   a tension spring positioned coaxially between said inner tube and said extension tube in said chamber between said tubes;
   said tension spring having opposite hooked ends with one end hook connected to said inner tube and the other end hook connected to said extension tube;
   said spring normally resiliently biasing said extension tube outer end axially outwardly of said body electrode, end,
   said extension tube being resiliently movable axially inwardly as by axially inwardly directed force against its outer end as by an electrode bearing thereagainst when an electrode is mounted in said body electrode end;
   said spring resiliently mounting said extension tube outer end in contact with an electrode when mounted to effect coolant fluid circulation close to an electrode when mounted in said body, said spring connection to said inner tube and to said extension tube maintaining mechanical connection between said tubes when an electrode is removed from said holder thereby maintaining the assembly when an electrode is removed and preventing said spring from ejecting said extension tube from the assembly when an electrode is removed.

References Cited
UNITED STATES PATENTS 2,360,889    2/1949    Larsen _____ 219—120

JOSEPH V. TRUHE, Primary Examiner

LAWRENCE A. ROUSE, Assistant Examiner